AMPLIFIED AUTOMATIC GAIN CONTROL FOR TELEVISION RECEIVER
Filed March 17, 1953
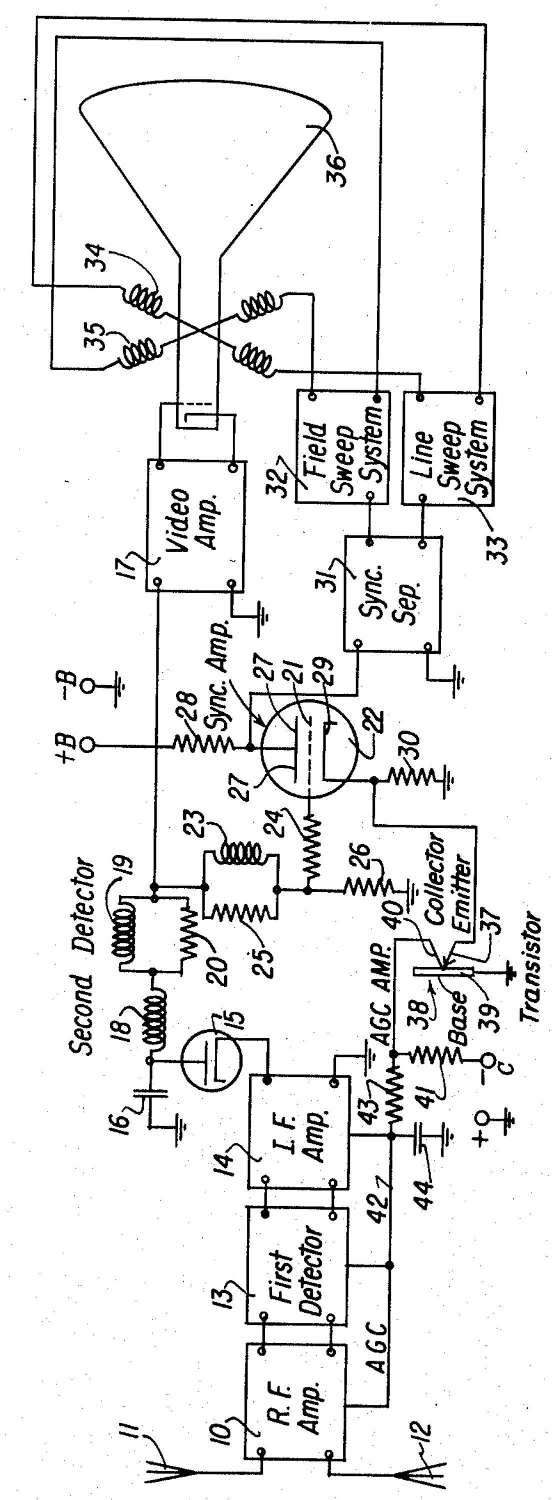
INVENTOR.
Marlin G. Kroger
BY Norman L. Mueller
Atty.

2,835,795
Patented May 20, 1958

2,835,795

AMPLIFIED AUTOMATIC GAIN CONTROL FOR TELEVISION RECEIVER

Marlin G. Kroger, Oak Park, Ill., assignor to Motorola, Inc., Chicago, Ill., a corporation of Illinois Application March 17, 1953, Serial No. 342,930

2 Claims. (Cl. 250—20)

The present invention relates to television receivers, and more particularly to an improved television receiver that incorporates a transistor circuit for automatic gain control purposes.

According to conventional practice in the construction of radio and television receivers, it is always desirable and in many cases essential to control the gain of the receiver in accordance with the intensity of the received signal. This is achieved, usually, by applying a control voltage to the high frequency stages of the receiver which decreases the gain of these stages for increased signal intensities in order to prevent the overloading of subsequent stages. This control is particularly essential where the receiver is operated in the proximity of relatively powerful broadcasting stations.

In radio broadcast receivers it is the usual practice to derive an automatic gain control potential by rectifying the incoming radio signal carrier. This has been considered infeasible in the case of a television receiver snce the carrier level of the transmitted television signal varies in accordance with background or average picture brightness. Until recent years, therefore, automatic gain control in television receivers has been accomplished by peak rectification of the synchronizing components of a received television signal and by utilizing the resulting rectified signal to control the amplification of the signal translating channel of the receiver inversely in accordance with the strength of the received signal. It has been found, however, that adequate gain control can be provided by utilizing the average value of the detected television signal at the second detector of the receiver. The second detector of most present-day television receivers is connected to produce a composition video signal, corresponding to the detected television signal, on a negative direct-current axis which varies in accordance with signal intensity and also in accordance with background variations of the received television signal. If a filter network is coupled to the detector which filters the video and synchronizing components of the composite video signal, and which has a sufficiently long time constant to be substantially unresponsive to the background variations manifest on its D. C. axis, a suitable AGC voltage for the receiver may be obtained. The AGC voltage varies in accordance with variations in the aforesaid D. C. axis due to different signal intensities, becoming more negative as signal intensities increase so as to be suitable for AGC purposes. This arrangement has been adapted to many commercial television receivers because of its inherent simplicity as compared with the peak-rectification type of AGC circuit.

The simple filter arrangement described above for the derivation of an AGC voltage is rendered even more advantageous when some means is provided for amplifying the signal in the AGC circuit. The basic advantage of such amplification is the attainment of a flatter AGC response in the receiver since a unit change in the detector voltage is amplified before being applied to the stages of the receiver under the control of the AGC circuit. Moreover, it is often desirable to provide an amplitude-delayed AGC to the radio frequency stages of the receiver for reasons well known to the art, and for reasons also well understood in the art this requires more AGC potential than is usually obtained by filtering of the detector voltage with no additional amplification.

Difficulties have been encountered in the past in providing amplification in the AGC circuit without necessitating the use of expensive and unduly complicated networks. These difficulties arise since it is preferable to supply the AGC voltage to the control electrodes of the discharge devices of the various signal translating stages in the receiver, and this raises the requirement that the AGC potential be negative with respect to a reference or ground axis in order that the cathodes of these discharge devices may conveniently be returned to ground instead of to a positive potential. Any attempt to amplify the composite video signal from the detector by an electron discharge device, by necessity places the D. C. axis of such signal at a positive value or destroys the D. C. axis completely. This condition necessitates relatively complicated and extraneous equipment and circuitry to provide a desired negative automatic gain control voltage from such amplified signal.

It is, accordingly, an object of the present invention to provide an improved television receiver which is constructed so that an automatic gain control voltage negative with respect to a selected reference potential axis may be derived in a simple and expedient manner and with sufficient amplification properly to perform its gain control function.

Another object of the invention is to provide a television receiver which includes an extremely simple and improved automatic gain control system.

A feature of the invention is the provision of a television receiver which includes a circuit for amplifying the detected television signal from the second detector of the receiver, and for producing such signal in amplified form on a D. C. axis negative with respect to a reference potential axis so that the amplified signal may be used to derive an automatic gain control voltage for the receiver which, likewise, has a desired polarity with respect to the reference potential axis.

A further feature of the invention is the provision in a television receiver of an automatic gain control system utilizing a transistor circuit for amplifying the detected components of a received television signal, together with its D. C. components, and maintaining the detected components on a D. C. axis which is appropriate for efficient use in the derivation of a suitable automatic gain control voltage.

The above and other features of the invention which are believed to be new are set forth with particularity in the appended claims. The invention itself, however, together with further objects and advantages thereof may best be understood by reference to the following description when taken in conjunction with the accompanying drawing in which the single figure shows a television receiver constructed in accordance with the invention.

The invention provides a television receiver which includes a detector which, in response to a received television signal, produces a composite video signal having video components and synchronizing components disposed on a direct-current axis varying in accordance with the background information of the televised scene represented by the television signal and also in accordance with the intensity thereof, the direct current axis being negative with respect to reference or ground potential. A vacuum tube circuit is directly connected to the detector which responds to the aforementioned detected signal to produce a similar signal but disposed on a D. C. axis which is positive with respect to ground or reference potential. The last mentioned network is, in turn, coupled to a transistor, and the transistor has an output circuit connected to a source of negative potential to derive the signal from the vacuum tube network in amplified form and disposed on a negative D. C. axis. The amplified signal from the transistor, since it has a negative D. C. axis, is appropriate for use in the derivation of an automatic gain control voltage negative with respect to ground and having sufficient amplitude properly to perform the control function.

The television receiver illustrated in the drawing includes a radio frequency amplifier 10 of one or more stages having input terminals connected to a suitable antenna circuit 11, 12 and having output terminals connected to a first detector or converter 13. The first detector is connected to an intermediate frequency amplifier 14 of any desired number of stages, and the output circuit of the intermediate frequency amplifier is connected to the cathode of a diode 15, the diode being included in the second detector of the receiver.

The anode of diode 15 is bypassed to ground for the intermediate frequency through a capacitor 16, and the anode is coupled to a video amplifier 17 of one or more stages through a pair of series-connected peaking coils 18 and 19, coil 19 being shunted by a damping resistor 20. The lead from coil 19 to video amplifier 17 is directly connected to the control electrode 21 of an electron discharge device 22 through a peaking coil 23 and limiting resistor 24; the peaking coil being shunted by a damping resistor 25, and the junction of coil 23 and resistor 24 being connected to ground through a grid-leak resistor 26. Device 22 is connected as an amplifier and has an anode 27 connected to the positive terminal of a source of unidirectional potential B+ through a load resistor 28, the negative terminal of the potential source being connected to ground. In accordance with a feature of the invention, the cathode 29 of discharge device 22 is connected to ground through a resistor 30, the resistor having a sufficiently low value so as to constitute negligible degeneration for the amplifier.

The anode 27 of discharge device 22 is connected to a synchronizing signal separator 31 which in turn, is connected to a field sweep system 32 and to a line sweep system 33. The output terminals of sweep systems 32 and 33 are connected respectively to the field deflection elements 34 and line deflection elements 35 of a cathode-ray image reproducing device 36, whereas the output terminals of video amplifier 17 are connected to the input electrodes of the image reproducing device.

The cathode 29 of discharge device 22 is directly connected to the emitter electrode 37 of a transistor 38, the transistor having a base electrode 39 connected to ground and further having a collector electrode 40. The collector electrode is connected to the negative terminal C— of a source of unidirectional potential through an output circuit including a load impedance element 41, here shown as a resistor; the positive terminal C+ of the last-mentioned source being connected to ground. The junction of collector electrode 40 and load impedance 41 is connected to the AGC lead 42 of the receiver through a filter including series resistor 43 and a capacitor 44 shunted between the AGC lead and ground. An automatic gain control voltage is developed in lead 42, and the lead is connected to the various stages 10, 13 and 14 of the receiver so that these stages may be controlled in accordance with well-known AGC principles.

In accordance with present-day standards, television signals have video components amplitude modulated on a picture carrier, and also have synchronizing components modulated on the same carrier and pedestalled to extend into the blacker-than-black region beyond the maximum video signal amplitude. When the receiver is tuned to utilize such a television signal intercepted by antenna 11, 12, the signal is amplified in radio frequency amplifier 10 and heterodyned to the selected intermediate frequency of the receiver in first detector 13. The resulting intermediate frequency signal is amplified in intermediate frequency amplifier 14 and detected in second detector 15. The second detector develops a demodulated composite video signal disposed on a D. C. axis negative with respect to ground and which varies in accordance with the intensity of the received television signal and also in accordance with the background information of the televised scene represented thereby. This composite signal is amplified in video amplifier 17 and in amplifier 22.

The video amplifier 17 applies the composite video signal to the input electrodes of cathode-ray image reproducing device 36 to control the intensity of the cathode-ray beam therein in accordance with such signal in well-known manner. As is well understood, the response characteristics of video amplifier 17 must be sufficiently broad so that all the higher frequency video components of the composite video signal are amplified thereby. Amplifier 22, on the other hand, need not have such a wide frequency response since its prime purpose is to supply the lower frequency synchronizing components of the composite video signal to the synchronizing signal separator 31 of the receiver. Amplifier 22 is directly coupled to second detector 15 so that it also translates the D. C. components of the composite video signal and the aforementioned D. C. axis thereof is not destroyed.

The synchronizing signal separator separates the synchronizing components from the video components of the composite video signal and uses the former to synchronize the field and line sweep systems of the receiver and, therefore, the field and line deflections of the cathode-ray beam in reproducing device 36. The operation of the television receiver thus far described is well known and, in accordance with known principles, device 36 is able to reproduce the picture information of an incoming television signal.

Since amplifier 22 is directly coupled to second detector 15, the composite video signal from the second detector appears across cathode resistor 30 on a positive D. C. axis which varies in accordance with the intensity of the composite video signal and also in accordance with the aforementioned background variations. Transistor 38 is of the positive-negative-positive or P–N–P type, and the composite video signal across cathode resistor 30 is applied to the emitter 37 of the transistor. The composite signal is again amplified in the transistor in accordance with well-known transistor characteristics, and appears across output resistor 41 connected to the collector electrode 40. Variations in the D. C. axis of the signal across resistor 30 changes the bias on the transistor and produces corresponding variations in emitter current with resulting variations in collector current. This produces corresponding variations of the D. C. axis of the signal appearing across resistor 41. The signal appearing across resistor 41 has the same phase as that across resistor 30 but, the D. C. axis thereof is negative with respect to ground by virtue of the fact that the transistor is of the P–N–P type and resistor 41 is connected to a negative biasing source C—. The video and synchronizing components of the composite signal are filtered out in filter 43, 44 and the filter has a sufficiently long time constant so that variations in the D. C. axis due to background do not appear on AGC lead 42. In this manner, an automatic gain control voltage is produced on lead 42 which is negative with respect to ground and which increases in a negative direction as the intensity of the received television signal increases to decrease the gain of the receiver accordingly. That is, any increase in the intensity of the composite video signal at the detector, for example, tends to reduce the conduction of amplifier 22. This reduces the bias on the transistor causing a reduction in transistor current and allowing the collector voltage across resistor 41 to become more negative which is in the proper direction to reduce the gain of the receiver.

Transistor 38 may be either of the junction or point contact type. Such transistors have a low input impedance characteristic which renders it impractical to couple them directly to detector 15 since the detector would be unduly loaded thereby. This impracticability is overcome in the circuit of the invention by the provision of resistor 30 in the cathode circuit of amplifier 22, with the cathode connected to the emitter electrode of the transistor. This connection matches the input impedance of the emitter and prevents undue loading on the detector, and this is achieved without the need for an extra stage but merely by the inclusion of a resistor in the cathode circuit of the synchronizing amplifier of the receiver.

It is evident, that so long as video amplifier 17 is not made degenerative for contrast control purposes, that it may be utilized as a source for the transistor instead of amplifier 22 merely by including resistor 30 in its cathode circuit. Moreover, the use of the cathode circuit of an amplifier stage as a signal source for the transistor also provides a measure of noise protection since high amplitude noise drives device 22 to cutoff and does not appear across resistor 30. It is to be noted that the use of the connection of transistor 38 through amplifier 22 to the detector establishes the proper preliminary bias condition for the emitter and allows base 39 to be directly grounded. When the transistor is driven directly by the second detector, a negative bias of the proper magnitude to render the transistor fully conductive under zero signal conditions would have to be provided for the base electrode when sensitive AGC action is desired.

The following parameters were used in a constructed embodiment of the invention, and are listed herein merely as an example and are intended in no way to limit the invention:

| | | |
|---|---|---|
| C— | volts | 20 |
| Resistor **30** | ohms | 50 |
| Resistor **41** | do | 22,000 |
| Resistor **43** | megohms | 1.5 |
| Capacitor **44** | micromicrofarads | 0.25 |

The invention provides, therefore, a television receiver which includes an improved circuit for automatically controlling the gain of the receiver, and which requires a minimum of components and circuitry and yet provides an amplified control voltage of proper polarity for sufficient and adequate automatic gain control of the receiver.

While a particular embodiment of the invention has been shown and described, modifications may be made, and it is intended in the appended claims to cover all such modifications as fall within the true spirit and scope of the invention.

I claim:

**1. A gain control system for a wave signal receiver adapted to utilize a modulated signal having alternating current and direct current components, including in combination demodulating means for deriving a demodulated signal representing the alternating current and direct current components with negative polarity, an electron discharge device for amplifying the demodulated signal and including cathode, control and anode electrodes, passive direct current coupling means for applying the demodulated signal to said control electrode, direct current impedance means coupled between said cathode electrode and a reference point, means for energizing said anode electrode with respect to said reference point so that a bias potential and the demodulated signal appears across said impedance means, circuit means for producing an amplified control potential related to the intensity of the demodulated signal, said circuit means including filter means to form a gain control potential related to the direct current level of the demodulated signal, said circuit means also including a transistor coupled to said filter means and having first, second and third electrodes, said first and second electrodes being coupled across said direct current impedance means for driving said transistor and biasing the same by means of said bias potential, a load impedance coupled to said third electrode and to a source of further bias potential for said transistor, and utilization means coupled to said circuit means for utilizing the gain control potential to regulate the level of signals applied to said demodulating means.

2. A system to provide a gain control potential for a television receiver adapted to utilize a modulated signal having synchronizing and video and direct current components, including in combination a detector for producing a demodulated signal representing the components with negative-going polarity, an electron discharge device for amplifying the demodulated signal and including cathode, control and anode electrodes, first resistor means coupled between said cathode electrode and a reference point, passive direct current coupling means for applying the demodulated signal to said control electrode, means for energizing said anode with respect to the reference point so that the demodulated signal with negative polarity and a bias potential appear across said first resistor means, a transistor having base and emitter and collector, said base and emitter being coupled across said first resistor means for driving said transistor and biasing the same by means of said bias potential, second resistor means coupled to said collector and to a source of further bias potential for said transistor, and filter means coupled to said second resistor means for forming a potential related to the intensity of the demodulated signal to regulate the level of signals applied to said detector.

References Cited in the file of this patent

UNITED STATES PATENTS

| | | |
|---|---|---|
| 2,294,117 | Hollingsworth | Aug. 25, 1942 |
| 2,644,083 | Bell | June 30, 1943 |
| 2,535,821 | Thomas | Dec. 26, 1950 |
| 2,647,957 | Mallinckrodt | Aug. 4, 1953 |
| 2,652,450 | Tourshou | Sept. 15, 1953 |